(12) United States Patent
Hembree et al.

(10) Patent No.: US 8,982,469 B2
(45) Date of Patent: Mar. 17, 2015

(54) LENS MASTER DEVICES, LENS STRUCTURES, IMAGING DEVICES, AND METHODS AND APPARATUSES OF MAKING THE SAME

(75) Inventors: David R. Hembree, Boise, ID (US); Steve Oliver, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 1036 days.

(21) Appl. No.: 13/042,124

(22) Filed: Mar. 7, 2011

(65) Prior Publication Data

US 2011/0157455 A1 Jun. 30, 2011

Related U.S. Application Data

(62) Division of application No. 12/216,032, filed on Jun. 27, 2008, now Pat. No. 7,916,396.

(51) Int. Cl.
*G02B 27/10* (2006.01)
*B29D 11/00* (2006.01)
*G02B 3/00* (2006.01)

(52) U.S. Cl.
CPC .......... *G02B 3/0025* (2013.01); *G02B 3/0031* (2013.01); *G02B 3/0056* (2013.01); *G02B 3/005* (2013.01); *B29D 11/00278* (2013.01)
USPC ............................ 359/619; 264/2.5; 264/1.32

(58) Field of Classification Search
CPC .... G02B 3/0056; G02B 3/0031; G02B 3/005; B29D 11/00278; B29D 11/00298; B29D 11/00307; B29D 11/00365
USPC .................................. 359/619; 264/1.32, 2.5
See application file for complete search history.

(56) References Cited

U.S. PATENT DOCUMENTS

| | | | |
|---|---|---|---|
| 5,837,156 A | 11/1998 | Cumming | |
| 6,021,106 A | 2/2000 | Welch et al. | |
| 6,381,072 B1 | 4/2002 | Burger | |
| 6,610,166 B1 | 8/2003 | Harden et al. | |
| 6,670,205 B1 * | 12/2003 | Byun | 438/22 |
| 6,735,844 B2 | 5/2004 | Saccomanno et al. | |
| 6,797,531 B2 | 9/2004 | Ohtsu et al. | |
| 6,825,985 B2 * | 11/2004 | Brown et al. | 359/619 |
| 6,892,002 B2 | 5/2005 | Christoffersen et al. | |
| 6,914,724 B2 | 7/2005 | Redmond | |
| 2003/0025227 A1 * | 2/2003 | Daniell | 264/2.5 |
| 2003/0209819 A1 | 11/2003 | Brown et al. | |
| 2006/0158511 A1 * | 7/2006 | Harrold et al. | 348/51 |
| 2006/0215270 A1 | 9/2006 | Tolley et al. | |
| 2007/0141191 A1 | 6/2007 | Kruijt-Stegeman et al. | |

OTHER PUBLICATIONS

Chih-Yuan Chang, et al., "Fabrication of polymer microlens arrays using capillary forming with a soft mold of micro-holes array and UV-curable polymer," Optics Express, vol. 14, No. 13, Jun. 26, 2006.

* cited by examiner

*Primary Examiner* — William Choi
(74) *Attorney, Agent, or Firm* — Dickstein Shapiro LLP (57) ABSTRACT

A method and apparatus providing a lens master device and use of the same to form a lens template and/or a lens structure. The method includes obtaining a plurality of individual lens masters, each of which has a shaped portion defining at least a portion of a lens structure to be formed. The lens masters are affixed onto a supporting structure to form a lens master device.

5 Claims, 9 Drawing Sheets

LENS MASTER DEVICES, LENS STRUCTURES, IMAGING DEVICES, AND METHODS AND APPARATUSES OF MAKING THE SAME

CROSS-REFERENCE TO RELATED APPLICATIONS

This application is a divisional of U.S. patent application Ser. No. 12/216,032, filed on Jun. 27, 2008, now U.S. Pat. No. 7,916,396 the subject matter of which is incorporated in its entirety by reference herein.

FIELD OF THE INVENTION

Embodiments of the invention relate generally to lens master devices, lens structures, imaging devices, and methods and apparatuses of making the same.

BACKGROUND OF THE INVENTION

Lenses have been used in various applications including, without limitation, flat-panel visual displays, solar panels, digital cameras, camera telephones, video telephones, computer input devices, scanners, machine vision systems, vehicle navigation systems, surveillance systems, auto focus systems, star trackers, motion detector systems, and image stabilization systems among other imager and display applications.

Lenses can operate in any of various ways. For example, in an imaging device, an objective lens is typically used in association with a pixel array to collect and focus incident light impinged on the objective lens onto the underlying associated pixel array. As a result, incident light can be more efficiently directed to and absorbed by the various photosensitive areas in the same pixel array, thereby improving photosensitivity of the imaging device. In a display device, a lens element can be used to diffuse incident light entering the lens element and radiate the light toward the front side of the display device for display purpose.

Lens fabrication typically involves lithography, such as e-Beam lithography, and etching, such as reactive ion etching (RIE), techniques. When they are employed to form objective lenses used in imaging devices, these techniques may be limited in their ability to create desired shapes and sizes and/or to achieve accurate profiles in the resultant patterned structures including lens templates or lens structures to be fabricated.

It is desirable to provide an improved method of fabrication and resultant structure for a lens master device, a lens structure, and an imaging device/system having a lens structure that mitigates the above problems.

DETAILED DESCRIPTION OF THE INVENTION

In the following detailed description, reference is made to the accompanying drawings, which form a part hereof and show by way of illustration specific embodiments and examples that may be practiced. These embodiments and examples are described in sufficient detail to enable those skilled in the art to practice them. It is to be understood that other embodiments and examples may be utilized, and that structural, logical, and electrical changes and variations may be made. Moreover, the progression of processing steps is described as an example; the sequence of steps is not limited to that set forth herein and may be changed, with the exception of steps necessarily occurring in a certain order.

The term "substrate" used herein may be any supporting structure including, but not limited to, a semiconductor substrate having a surface on which devices can be fabricated. A semiconductor substrate should be understood to include silicon, silicon-on-insulator (SOI), silicon-on-sapphire (SOS), doped and undoped semiconductors, epitaxial layers of silicon supported by a base semiconductor foundation, and other semiconductor structures, including those made of semiconductors other than silicon. When reference is made to a semiconductor substrate in the following description, previous process steps may have been utilized to form regions or junctions in or over the base semiconductor or foundation.

The term "pixel" or "pixel cell" as used herein refers to a photo-element unit cell for either capturing or emitting light. For example, a pixel can contain at least a photosensor for converting photons to an electrical signal as may be employed by an imaging device. The pixel cells described herein can be CMOS four-transistor (4-T) pixel cells, or CMOS pixel cells that have more or less than four transistors. In addition, the embodiments disclosed herein may be employed in other types of solid state imaging devices other than CMOS imaging devices, e.g., CCD devices and others, where a different pixel and readout architecture may be used. Alternatively, a pixel can contain at least one photo emitting element for producing light as may be employed in an image display device.

The term "lens" as used herein refers to a transparent structure that can change light paths from a generally larger field to a generally smaller field or vice versa. For example, the lens can include an objective lens for focusing incident light onto an underlying pixel array, as may be used in various solid state imaging devices including CMOS imaging devices and charge coupled devices (CCDs) and other imaging devices.

Various embodiments are now described with reference to the drawing figures, in which similar components and elements are designated with the same reference numeral and redundant description is omitted. Although certain embodiments below are described in relation to use with a CMOS imaging device, as noted above, such embodiments are not so limited and have applicability to other solid state imaging and display devices.

Figure 1A:
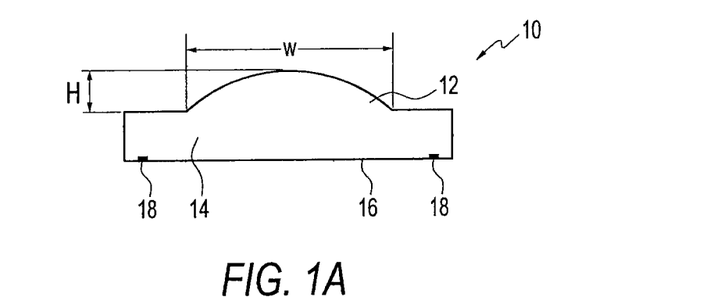
FIGS. 1A and 1B are cross-sectional views of lens masters formed according to different embodiments described herein.

FIG. 1A illustrates one embodiment of a lens master 10. The lens master 10 comprises a shaped portion 12, which can be supported on a base portion 14. The shaped portion 12 of the lens master 10 can be formed to have any of various shapes and sizes to define at least a portion of a lens structure 300 (see FIG. 5C) to be formed. In the example shown in FIG. 1A, the shaped portion 12 has a convex shape, which can form a concave structure. For example, the convex shaped portion 12 can form a concave lens die 206 (see FIG. 4D), which can in turn define a convex shaped lens 306 (see FIG. 5C). The shaped portion 12 can be either spherical or aspherical.

The shaped portion 12 can be formed to have a lateral dimension W and an axial dimension H, as shown in FIG. 1A. In one example, the shaped portion 12 can define an objective lens 306' used in association with a pixel array 400 in an imaging device 500 (see FIG. 6). The resultant objective lens 306' can have a lens diameter that is the same as the lateral dimension W and expands across the underlying pixel array 400. The height of the resultant objective lens 306' is the same as the axial dimension H of the shaped portion 12 and sufficient to direct incident light to the underlying pixel array 400.

The shaped portion 12 of the lens master 10 can be formed of any of various rigid materials to retain the configuration of the shaped portion 12. Examples of materials suitable for making the lens master 10 can include, but are not limited to, silicon, silicon-on-insulator (SOI), germanium, quartz, glass, borosilicate, GaAs, SiGe, GaN, GaP, InP, plastics, metals (e.g., stainless steel, iron, nickel, copper, or aluminum), and other materials. For example, the shaped portion 12 is made of a glass material. Those skilled in the art will appreciate that the shaped portion 12 can be formed to have other shapes, sizes, and/or materials.

The base portion 14 of the lens master 10 can be formed in various manners to support the shaped portion 12. For example, at least a portion of the base portion 14 can extend laterally or radially beyond the shaped portion 12, as is shown in FIG. 1A. The base portion 14 can be integrally formed with the shaped portion 12, such as e.g., through an injection molding process. The base portion 14 can have a planar surface 16 formed opposite from the shaped portion 12. The planar surface 16 of the base portion 14 can be brought in contact with or otherwise placed on a planar surface 34t (FIG. 2C) on the supporting structure 32 as discussed below.

As is shown in FIG. 1A, one or more alignment marks 18 can be provided on the base portion 14 to assist the formation of the lens master device (described, in detail below). The alignment marks 18 can be in various forms, such as etched pockets or metalized fiducials. Each alignment mark 18 on the base portion 14 can be used in assisting the formation of the lens master device 30 (FIG. 2C) described in detail blow.

Various methods can be employed to form the lens master 10. For example, the shaped portion 12 of the lens master 10 is formed by a high-precision shaping process to ensure enhanced accuracy of the resultant portion 12. Examples of high-precision shaping processes include, but are not limited to, molding and grinding-polishing processes. In one example, the shaped portion 12 can be formed by injection molding a glass or plastic material. In another example, a diamond turning process can be used to obtain a shaped portion 12 on the lens master 10 to obtain sub-nanometer level surface finishes and/or sub-micrometer form accuracies in the resultant shaped portion 12. Those skilled in the art will appreciate that other high-precision shaping processes can also be employed to form the shaped portions 12 and the lens master 10.

Figure 1B:
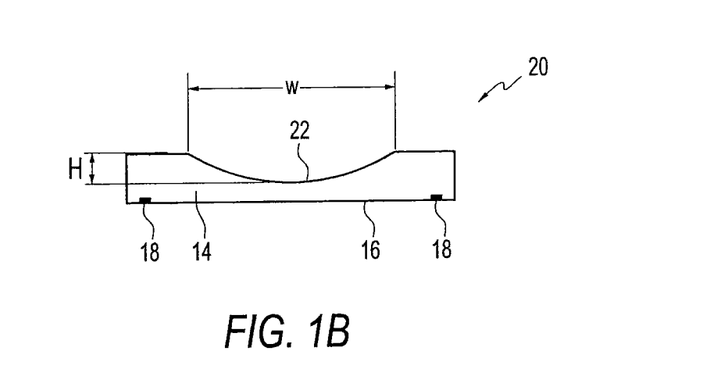

FIG. 1B illustrates another embodiment of a lens master 20, which can be formed similarly to the lens master 10 described above. The various components of the lens master device 20 are shown in the figure, but the description of the components similar to those in the above embodiment is omitted. In this embodiment, the lens master 20 is formed to have a concave shaped portion 22 for patterning a convex configuration. For example, the concave shaped portion 22 is formed by a diamond turning process. As FIG. 1B shows, the concave shaped portion 22 has a lateral dimension W and an axial dimension H to define a lens structure, such as an objective lens 306a (FIG. 5E), to have the same lateral dimension W and axial dimension H. For example, the resultant objective lens 306a can have a lens diameter W, which expands across an underlying pixel array. The height H of the resultant objective lens 306a is formed to be sufficient to direct incident light to the underlying pixel array.

Figure 2A:
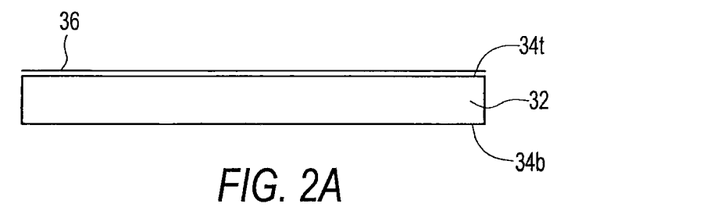
FIGS. 2A through 2C illustrate method steps for forming a lens master device according to an embodiment disclosed herein.
Figure 2B:
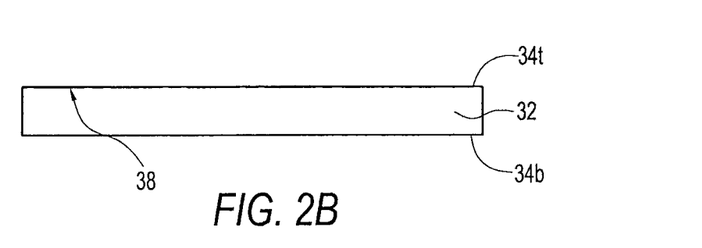
Figure 2C:
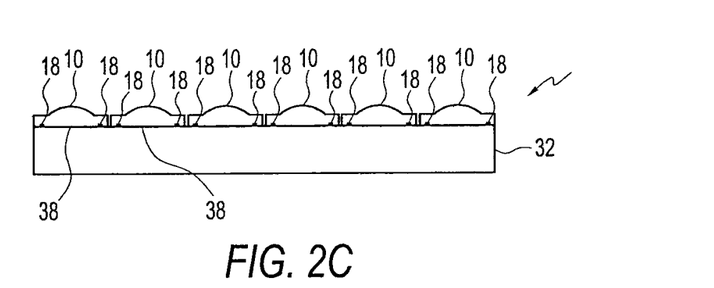
Figure 2D:
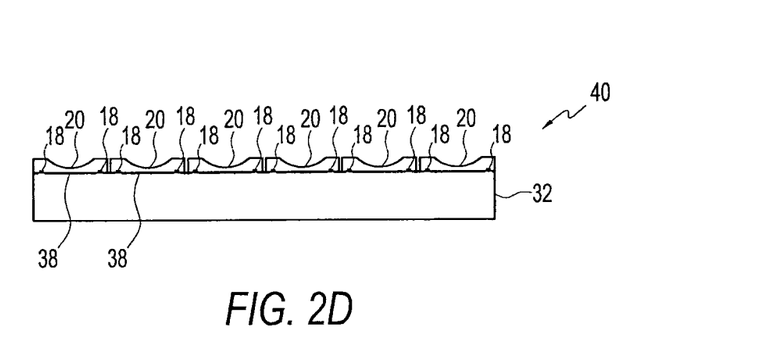
FIG. 2D shows an alternative lens master device formed.

FIGS. 2A through 2C illustrate example stages of a method of forming a lens master device 30 in accordance with one embodiment. A supporting structure 32 is provided, as is shown in FIG. 2A, for supporting multiple lens masters 10, 20 (FIGS. 2C, 2D). In one example, the supporting structure 32 is defined by two opposite surfaces 34t, 34b, one of which can be a planar surface (e.g., surface 34t). For example, the planar surface 34t can be formed by planarization. The supporting structure 32 can be formed of any of various materials, such as metal, glass, polymer, ceramics, silicon, quartz, or other materials. In one example, the supporting structure 32 is a silicon wafer of various sizes, e.g., a diameter of about 200 mm.

The supporting structure 32 can be formed with one or more alignment marks 38 (FIG. 2B) for use to align the lens masters 10, 20 on the supporting structure 32 as discussed in greater detail below. For example, the alignment marks 38 can be in the form of fiducials, which can be formed into a surface 34t, 34b of the supporting structure 32. Any of various techniques, such as printing, etching through a photopattern process, or laser ablation, can be used for the above purpose.

In the example shown in FIG. 2A, a metallic film 36 can be formed over the supporting structure 32 and patterned to form one or more alignment marks 38 (FIG. 2B) by any of various methods. For example, the metallic film 36 can be formed by plating or by any of various deposition methods, including but not limited to, chemical vapor deposition (CVD), physical vapor deposition (PVD), or sputtering deposition. In one example, the metallic film 36 (e.g., chrome) can be deposited on the surface 34t by e.g., a plating process. The metallic film 36 is then patterned to form a plurality of alignment marks 38 as shown in FIG. 2B. For example, the alignment marks 38 can be metalized fiducials formed on surface 34t of the supporting structure 32. Those skilled in the art will appreciate that alignment marks 38 can be formed in various other forms and by various other methods. For example, a photolithographic process can be used to form one or more etched pockets (not shown) in the supporting structure 32.

FIG. 2B shows a plurality of alignment marks 38 formed on the surface 34t of the supporting structure 32 as described above. Such alignment marks 38 can facilitate in positioning various lens masters 20 on the supporting structure 32 during the formation of the lens master device 30. For example, each alignment mark 38 can correspond to a lens master 10 in the resulting lens master device 30 (FIG. 2C) as described below. The alignment marks 38 can be arranged to have various patterns. For example, when a wafer is used as the supporting structure 32, the alignment marks 38 can be evenly distributed across the wafer.

FIG. 2C shows that the supporting structure 32 can be populated with multiple lens masters 10 as described above in connection with FIG. 1A. The multiple lens masters 10 are separately formed from the supporting structure 32 and can be separated from one another prior to being associated with the supporting structure 32. For example, each of the lens masters 10 can be individually fabricated by any of various high-precision processes, such as a diamond turning process, to ensure the accuracies of the shaped portions 12. As described above, each lens master 10 is formed to have lateral and axial dimensions W and H, respectively.

In the example shown in FIG. 2C, each lens master 10 can be positioned on the supporting structure 32 in reference to an alignment mark 38. For example, the alignment mark 18 on each lens master 10 can be aligned with an alignment mark 38 on the supporting structure 32. Those skilled in the art will appreciate that other methods can be employed to position each lens master 10 on the supporting structure 32.

In one example, the individual lens masters 10 can be loaded onto and affixed to the supporting structure 32 by a pick and place technique. For example, the planar surface 16 of a lens master 10 is placed in contact with surface 34t so that the lens master 10 is placed onto the supporting structure 32. After a first lens master 10 is placed in position on the supporting structure 32, the process is repeated to place the next lens master 10 in an adjacent or other predetermined location. In the example where the supporting structure 32 is in the form of a wafer, the pick and place process can be carried out to load the lens masters 10 across the wafer. Although only six lens masters 10 are shown in FIG. 2C, the lens master device 30 can contain many thousands of lens masters 10.

The individual lens masters 10 are affixed to the supporting structure 32 by any of various methods so that the lens masters 10 and the supporting structure 32 become a unitary structure. In one example, each of the individual lens masters 10 can be bonded to the supporting structure 32 through an ultraviolet (UV) bonding process. For example, an ultraviolet (UV) cured adhesive, such as polyurethanes, epoxies, polyesters, and acrylics, can be applied to the lens masters 10 or the supporting structure 32 before the lens masters 10 being positioned on the supporting structure 32. An appropriate ultraviolet (UV) radiation source can be employed to cure the adhesive and bond the lens masters 10 with the supporting structure 32. In one example, the ultraviolet (UV) bonding process is carried out at the end of the pick and place process. Those skilled in the art will appreciate that various other methods can be used to affix the separately formed lens masters 10 onto the supporting structure 32 to form a lens master device 30.

The finished lens master device 30 can be used to pattern suitable materials to form lens templates 200 (FIG. 4D) as will be described in greater detail below. In the example shown in FIG. 2C, the lens master device 30 is formed with convex lens masters 10. As is described in greater detail below, such a lens master device 30 can be employed to form a lens template 200 (FIG. 4D) with a plurality of concave shaped lens dies 206, which can be used to form a lens structure 300 with convex shaped lenses 306 (FIG. 5C). As one skilled in the art will appreciate, the lens master device 30 can also be used to directly pattern and form negative concave lenses (not shown) in a similar manner as is described above.

FIG. 2D shows another lens master device 40, which can be formed similarly to the lens master device 30 described above. For example, the lens master device 40 is formed by picking and placing separately formed lens masters 20 over the supporting structure 32 and bonding the lens masters 20 with the supporting structure 32. Similar alignment marks 18, 38 can be provided on the respective lens masters 20 and supporting structure 32 to facilitate their alignment. The various components of the lens master device 40 are shown in the figure, but the description of the components and process steps similar to those in the above embodiments is omitted. In this embodiment, the lens masters 20 each have a concave configuration, similar to that shown in FIG. 1B. The resulting lens master device 40 can be used to form a lens template 200a (FIG. 5D) with a plurality of convex shaped lens dies 206a, which can be used to form negative lenses 306a.

Figure 3A:
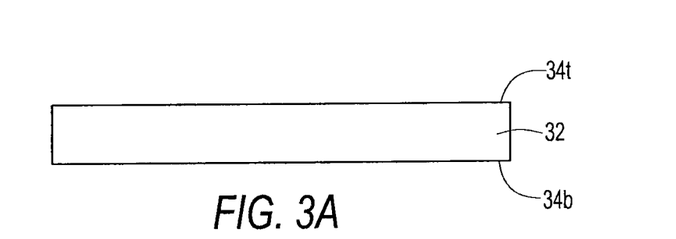
FIGS. 3A to 3D illustrate method steps for forming a lens master device according to another embodiment disclosed herein.
Figure 3B:
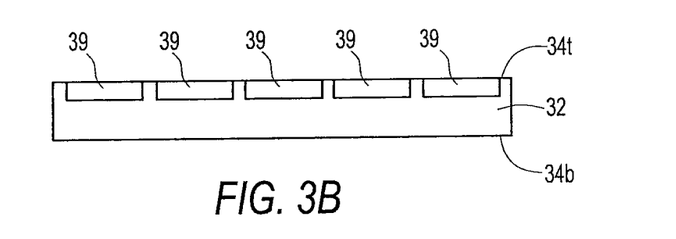
Figure 3C:
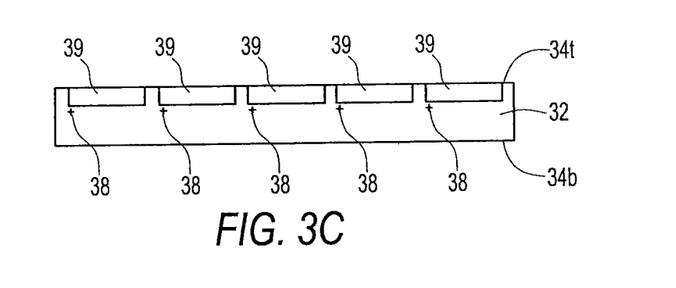
Figure 3D:
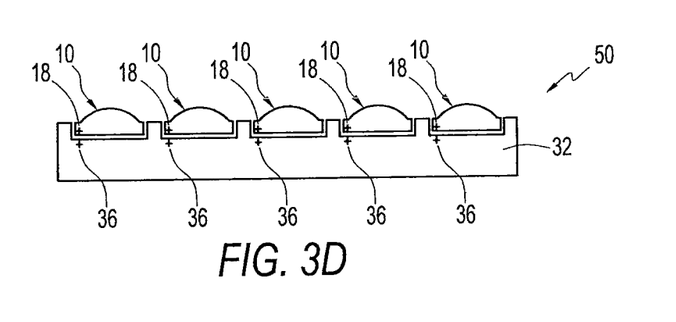

FIGS. 3A through 3D illustrate example stages of a method for forming a lens master device 50 in accordance with another embodiment. The various components of the lens master device 50 and process steps employed in this embodiment are shown in the figures, but the description of the components and process steps similar to those in the above embodiments is omitted. In this embodiment, the supporting structure 32 can be formed with a plurality of recessed portions 39, which are recessed into the supporting structure 32 from surface 34t, as shown in FIG. 3B. Each recessed portion 39 can be formed to receive one lens master 10, 20. In one example, each recessed portion 39 accommodates the base portion 14 of lens master 10 (FIG. 3D).

FIG. 3C shows one or more alignment marks 38 being provided in the recessed portions 39 formed in the supporting structure 32. Each alignment mark 38 can be aligned with those on the corresponding lens masters 10, as is described above. Additionally or alternatively, alignment marks 38 can be provided on the surface 34t of the supporting structure 32, similarly to those shown in FIG. 2B.

FIG. 3D shows individual lens masters 10 being placed in the recessed portions 39 by any of various methods, such as e.g., a pick and place process. In one example, the alignment marks 38 on the supporting structure 32 are aligned with the alignment marks 18 on the lens masters 10. The lens masters 10 can be affixed in place by any of various methods, such as ultraviolet (UV) bonding as described above, to form a lens master device 50.

FIGS. 4A through 4D illustrate example stages of a method of using a lens master device 100 to form a lens template 200 in accordance with a further embodiment. The lens master device 100 shown in FIG. 4A can be any of the lens master devices 30, 40, 50 described above. In the example shown in FIG. 4A, the lens master device 100 can be formed similarly to the lens master device 30 and may comprise a plurality of convex lens portions 10 affixed to a supporting structure 32.

The lens master device 100 can be used to pattern a suitable material for forming a lens template 200 (FIG. 4D) having multiple concave lens dies 206 for use in providing convex shaped lens structures 306 as discussed below. For example, a template material 202 can be made to conform to the shape of the various lens masters 10 of the lens master device 100 by coating (e.g., spin coating, spray coating), dispensing, injecting, molding, or otherwise depositing a template material 202 on a template support 204 and forcing the lens master device 100 into the template material 202. In the example shown in FIG. 4B, a template material 202 is deposited on the template support 204 by any of various methods, such as coating (e.g., spin coating, spray coating), dispensing, and injecting. The lens master device 100 is flipped over and brought towards and into contact with template material 202 deposited on the template support 204.

Various template materials 202 can be employed to form the lens template 200. The template material 202 can be determined to facilitate the fabrication of lens structures 300 (FIG. 5C). In one example, the template material 202 is transparent to ultraviolet radiation to allow ultraviolet light to pass through the lens template 200 and cure the lens material 302 during an ultraviolet molding process to fabricate the lenses 306 on the lens structure 300. In another example, the template material 202 is one that can withstand the heat used during a lens formation process. For example, the template material 202 can be a non-thermoplastic material. The template material 202 so chosen can enable the lens dies 206 to maintain the patterned shape during the molding process without causing deformation or distortion to the lenses 306 under formation.

Additionally or alternatively, the template material 202 can be chosen to facilitate the formation and/or ensure the desired resolution of the lens template 200. For example, the template material 202 can be a polymer material that can adequately conform to the lens masters 10 on the lens master device 100. In another example, the template material 202 is chosen to allow the formed lens template 200 to be detached from the lens master device 100 without causing damage or distortion to the lens dies 206 after the patterning process is completed.

Examples of template materials 202 can include, but are not limited to, polyvinyl alcohol (PVA), polydimethylsiloxane (PDMS), a non-thermoplastic polymer or other polymer materials, and nickel plated layer or other plating materials. In one example, the lens template material 202 can be formed of a polydimethylsiloxane (PDMS) material. Those skilled in the art will appreciate that various other template materials can also be used to form the lens dies 206.

The template support 204 can be formed of any of various materials to support the template material 202 during the formation of the lens dies 206 as described below and support the lens dies 206 in a later lens formation process. The template support 204 can be formed to be flexible or rigid and/or formed of a plastic, glass, or other support material. In one example, the template support 204 is formed of the same material, such as polydimethylsiloxane (PDMS), used to form the lens dies 206. In another example, the template support 204 is formed of a material such that the template support 204 is more rigid than the lens dies 206 to provide additional rigidity and stiffness to the lens dies 206. Such a template support 204 is capable of counteracting external forces exerted on the lens dies 206 and maintaining their shape during a lens molding process. For example, the template support 204 may be a glass substrate.

Additionally or alternatively, the template support 204 can be formed of any of various materials that can be used during one or more molding processes for making lenses 306. In one example, the template material is transparent to ultraviolet radiation, so that the resulting template support 204 can be used in an ultraviolet radiation curing process to form lenses 306 as is described in greater detail below. For example, the template support 204 can be formed of polydimethylsiloxane (PDMS). In another example, the template support 204 is made of a material that can withstand the heating treatment carried out in a thermoplastic molding process to form the lenses 306. For example, the template support 204 can be formed of a non-thermoplastic material. Those skilled in the art will appreciate that various other materials can also be used to form the template support 204.

Figure 4A:
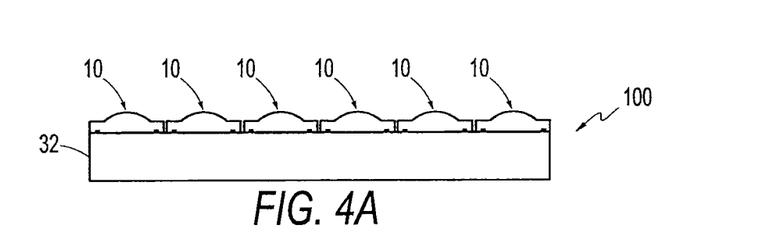
FIGS. 4A to 4D illustrate method steps for forming a lens template according to a further embodiment disclosed herein.
Figure 4B:
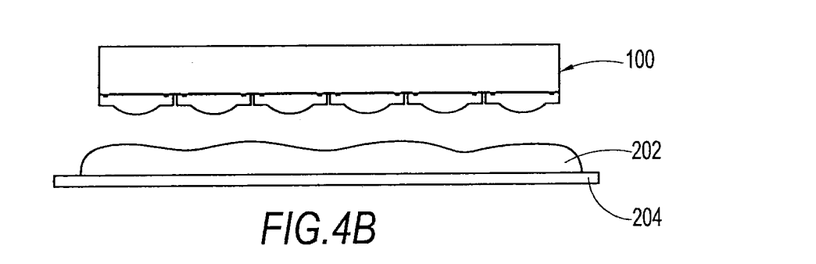
Figure 4C:
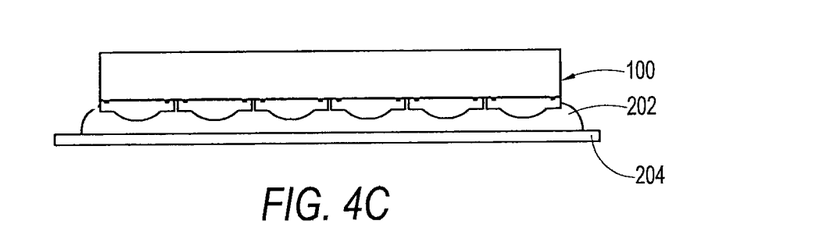

FIG. 4C shows that the lens master device 100 is used to mold the template material 202 and transfer the shape of the lens masters 10 to the template material 202. After the template material 202 is conformed to the shape of the various lens masters 10, the patterned template material 202 can be cured to stabilize the transferred pattern shape formed in the template material 202. For example, the patterned template material 202 can be subjected to an ultraviolet (UV) source (not shown) to cure and solidify the template material 202. Those skilled in the art will appreciate that other methods can be used to transfer the configuration of the lens masters 10 to the template material 202.

Figure 4D:
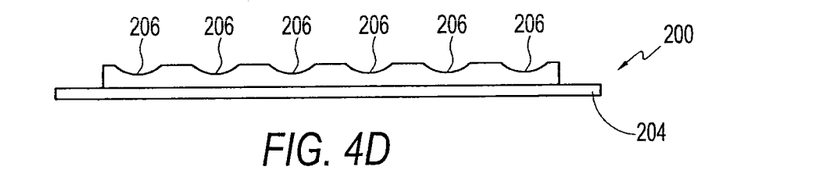

FIG. 4D shows that the lens master device 100 has been removed from the patterned lens template material 202 leaving the lens template 200. The lens master device 100 can be reused to make additional lens templates 200. To aid in releasing the lens template 200, the lens master device 100 can be provided with a non-stick coating, such as a polytetrafluoroethylene, or parylene coating.

The resultant lens template 200 contains a plurality of lens dies 206 supported on the template support 204. In the example shown in FIG. 4D, the lens dies 206 can be formed across the entire template support 204. Each lens die 206 can be in the form of a negative replica of a corresponding lens master 10. In the example shown in FIG. 4D, the convex shaped lens masters 10 in the lens master device 100 can form a plurality of concave shaped lens dies 206 in the finished lens template 200. Each concave lens die 206 has the same size (e.g., width W and height H) as does a corresponding lens master 10.

Figure 5A:
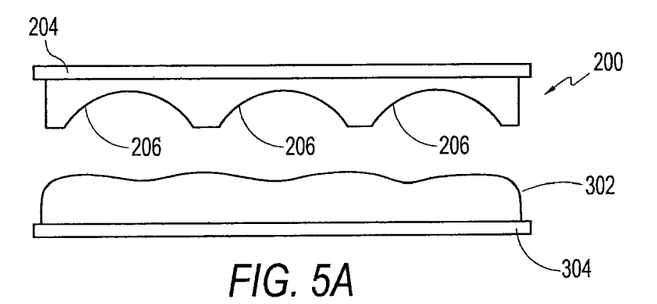
FIGS. 5A to 5E illustrate method steps for forming lens structures according to additional embodiments disclosed herein.
Figure 5B:
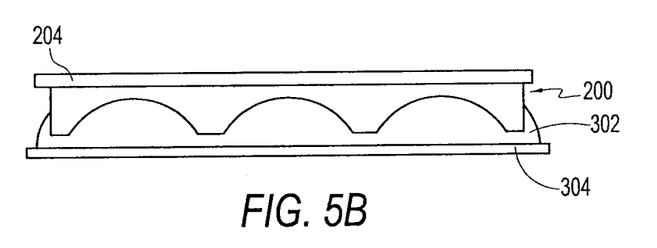
Figure 5C:
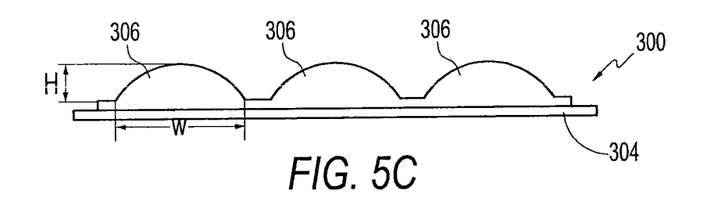

FIGS. 5A to 5C illustrate example stages of a method of using a lens template 200 to form lens structures 300 in accordance with another embodiment. For example, the lens template 200 can be used in various manners to pattern a lens material 302 to conform to the shape of the various lens dies 206. In the example shown in FIG. 5A, a lens material 302 is deposited on a lens support 304 by any of various methods, such as coating (e.g., spin coating, spray coating), dispensing, and injecting. The above described lens template 200 is flipped over and brought towards the lens material 302 on a lens support 304. The lens support 304 provides support to the lens material 302 during the lens formation process, and/or supports the lenses 306 in the finished lens structure 300. The lens support 304 can be formed of any of various suitable materials, such as e.g., a rigid material to provide adequate support to the lenses 306. The lens support 304 can be a transparent material to allow incident light to pass therethrough when used in an imaging device 500 (see FIG. 6). In one example, the lens support 304 is formed of glass.

Various lens materials 302 can be used to form the lenses 306 in the lens structure 300. For example, the lens material 302 can be any of transparent glass or polymer materials suitable for making lenses, such as image objective lenses. In one example, the lens material 302 can be any material capable of conforming to the lens dies 206 on the lens template 200 and achieving the required resolution in the finished lenses 306. Examples of suitable lens materials can include, but are not limited to, acrylic polymers with cross-linking components such as certain hydroxyl, epoxy, and amino compounds that may cross-link with one another, silicones, particularly organosilicons, and polysiloxanes. Suitable lens materials can also include substantially colorless polyimide and perfluorocyclobutane containing ether polymers. Those skilled in the art will appreciate that various other lens materials can also be used to form the lenses 306.

FIG. 5B shows that the lens template 200 is used to pattern the lens material 302 by e.g., molding the lens material 302 supported on the lens support 304. After the lens material 302 is patterned, it can be cured by any of various methods. In one example, the patterned lens material 302 is subjected to ultraviolet radiation. The ultraviolet radiation causes the lens material 302 to be crosslinked and create a polymer system. The cured lens material 302 can thus achieve sufficient mechanical strength and chemical stability, allowing e.g., the lens template 200 to be separated and detached from the resultant lenses 306 without damaging or deforming the same. The cured lens material 302 can also retain the shape of the lenses 306 during subsequent processes. Those skilled in the art will appreciate that other methods can be used to pattern a lens material 302, or otherwise form a lens structure 300 containing multiple lenses 306.

FIG. 5C shows a finished lens structure 300 after the lens template 200 has been detached and removed. The lens structure 300 contains a plurality of lenses 306 formed to have a convex configuration. In the example shown in FIG. 5C, each of the lenses 306 can be a positive replica of a corresponding lens master 10. For example, each lens 306 can have the same shape and size (e.g., width W and height H) as does the lens master 10. Those skilled in the art will appreciate that the lenses 306 can have various other shapes, configurations, dimensions, and/or arrangements depending on various design factors, for use in other electronics and semiconductor components and devices as discussed below.

Although FIG. 5C shows the lenses 306 formed on a portion of the lens support 304, those skilled in the art will appreciate that the lenses 306 can be formed throughout substantially an entire lens support 304, for example, an entire wafer substrate used in the fabrication of integrated circuits. In one example, the lenses 306 are formed over an entire wafer substrate, in a single patterning process step to improve throughput and uniformity of the lenses 306. In such an example, the plurality of lenses 306 on the wafer can be dissected and then individually used.

Figure 5D:
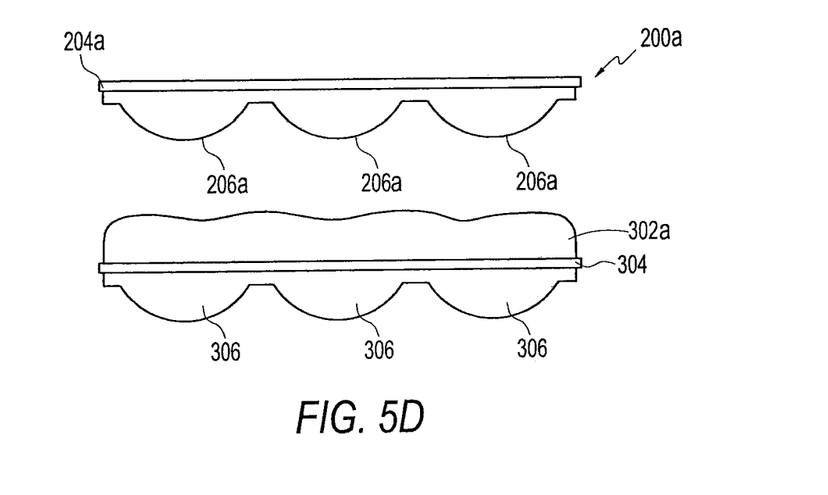
Figure 5E:
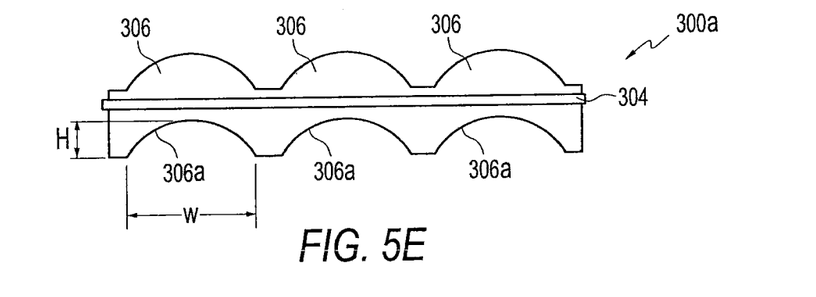

FIGS. 5D and 5E illustrate additional process steps for forming an alternative lens structure 300a. As FIG. 5D shows, the above described lens structure 300 is flipped over so that its lens support 304 can receive another lens material 302a deposited thereon. The lens material 302a can be any of the suitable lens materials discussed above. The additional lens material 302a can be patterned to form concave shaped lenses 306a using a lens template 200a having convex lens dies 206a. In the example shown in FIG. 5D, each lens die 206a on the lens template 200a is aligned with a lens 306 to obtain a resultant lens structure 300a having a desired lens configuration, as is shown in FIG. 5E. For example, convex and concave lenses 306, 306a are formed on the opposite sides of the lens support 304 and positioned to form a convex-concave configuration.

In another example, the lens structure 300a can be formed by depositing lens materials 302, 302a on the opposite sides of the lens support 304 by any of various methods, such as coating (e.g., spin coating, spray coating), dispensing, and injecting. The lens materials 302, 302a can be patterned simultaneously to form lenses 306, 306a on the opposite sides of the lens support 304 to improve the efficiency of the process. For example, the lens materials 302, 302a can be molded simultaneously to form convex and concave lenses 306, 306a, as those shown in FIG. 5E. Those skilled in the art will appreciate that other methods can also be used to form various lens structures with the same or additional different configurations.

The formed lens structures 300, 300a can be any of various molecular structures, which can be incorporated in various electronics and semiconductor components and devices for electrical, electronic, optical, photonic, biological, material, storage, and other applications. Examples of electronics and semiconductor components and devices include a metal-oxide-semiconductor field-effect transistor (MOSFET), an organic thin-film transistor (O-TFT), a single electron memory, a data storage device, an optical disk (CD), a light emitting diode (LED), a display device, an objective lens used in a semiconductor-based imaging device and system as described below, and other components and devices.

Figure 6:
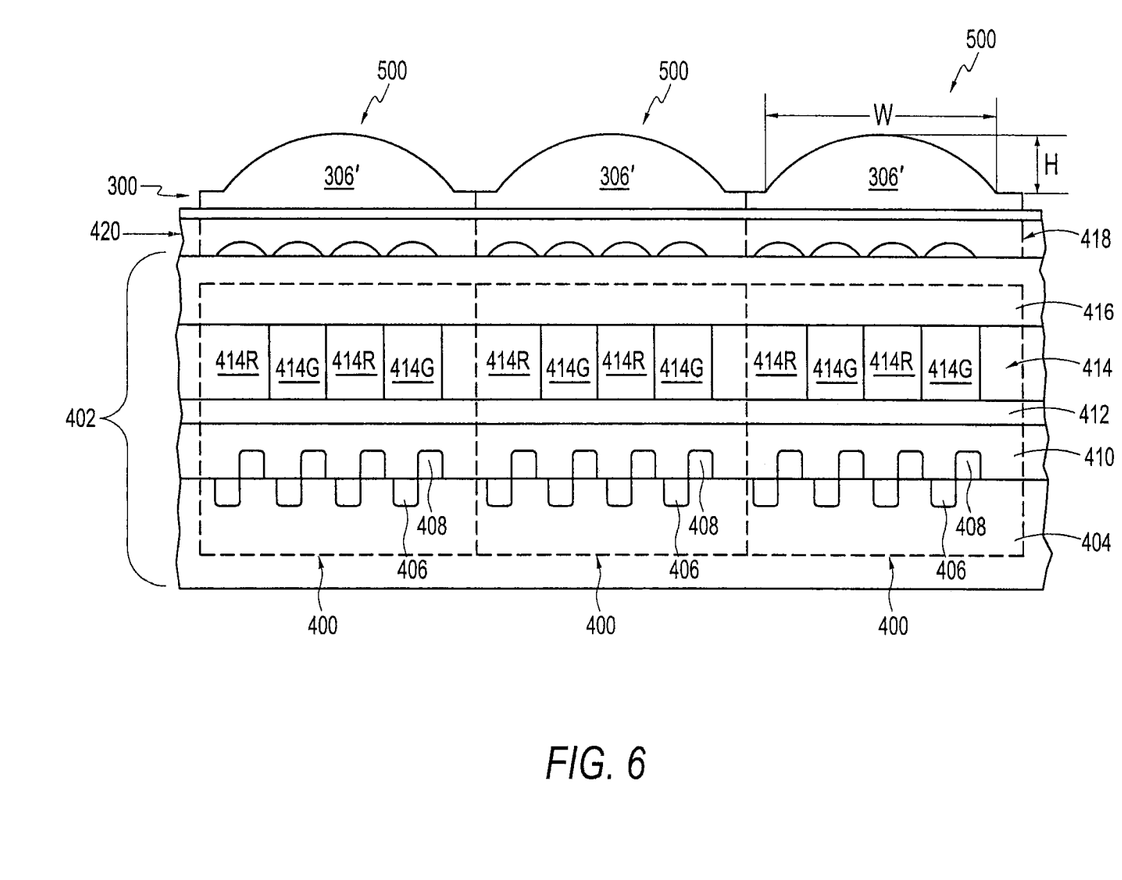
FIG. 6 illustrates an imaging device containing a lens structure shown in FIG. 5C.

In one example, each lens 306 in the lens structure 300 can be formed as an image objective lens 306' and be associated with a corresponding pixel array 400 in an imaging device 500, as shown in FIG. 6, such as to improve the optical performance of such imaging device 500. For example, each image objective lens 306' can have a convex contour to effectively focus incident light onto the underlying pixel array 400 so that the incident light can be absorbed by the pixel photosensors 406 more efficiently.

FIG. 6 shows a lens structure 300 being used to form imaging devices 500, such as CMOS imaging devices. In the example shown in FIG. 6, the lens structure 300 contains a plurality of objective lenses 306' each being associated with a pixel array 400 formed on an imager wafer 402. The imager wafer 402 is formed with a plurality of pixel arrays 400, each in turn containing a multiplicity of pixel cells. For example, the lens structure 300 can be formed to have a through-wafer interconnect (TWI) structure and be interconnected with a TWI imager wafer formed by any of various methods. Although FIG. 6 shows only three pixel arrays 400, thousands of pixel arrays 400 could be formed in a single imager wafer 402 to contain millions of pixel cells, depending upon the size and resolution of the imaging devices 500. As the plural pixel arrays 400 can be formed to have a similar structure, the following description is provided in connection with only one pixel array 400, such as the one located on the right in FIG. 6.

A semiconductor device substrate 404 is provided for each pixel array 400. The device substrate 404 can be a single layer structure, such as an active silicon layer, or a combination of several layers with different implantation conductivities and concentrations. As those skilled in the art will appreciate, the device substrate 404 can be in various forms and be formed by various methods.

Various semiconductor components of the pixel array 400 can be formed over the device substrate 404. As FIG. 6 shows, a plurality of pixel photosensors 406 are formed in association with the device substrate 404. Any of suitable photosensors 406, such as photogates, phototransistors, photoconductors, or photodiodes, can be employed. For a color imaging device, each photosensor 406 can be formed to receive one of red, green, and blue light passing through an appropriate color filter. For a monochromatic imaging device, all photosensors 406 of the pixel array 400 can receive the same incident, wavelengths, through no filter or the same color filter. For example, all photosensors 406 are formed to detect infrared light. Those skilled in the art will appreciate that the photosensor 406 can be in various other forms.

Each pixel array 400 can comprise various other semiconductor structures and components that may be conventionally employed and formed in association with the substrate 404. For example, a transistor 408, such as one used in a 4-T CMOS imager pixel or other CMOS pixel architectures, can be provided in each pixel for controlling the transfer of changes generated by the corresponding photosensor 406. A plurality of interlayer dielectric layers and associated metallization structures, collectively shown as 410, can be provided over various pixels in the image pixel array 400. A passivation layer 412 may be formed over the interlayer dielectric layers 410, and may be planarized, such as by chemical mechanical polishing (CMP), to create a substantially planar surface. The passivation layer 412 can be formed, for example, of one or more of phospho-silicate-glass (PSG), silicon nitride, nitride, oxide, and oxynitride. Those skilled in the art will appreciate that the transistors 408, interlayer dielectric layers 410, and passivation layer 412 can be in various other forms and be formed by various methods.

Optionally, a color filter array 414 can be provided over the passivation layer 412. The color filter array 414 can comprise multiple color filters, such as red, green, and blue filters, two of which 414R, 414G are shown in FIG. 6. Each color filter 414R, 414G can be positioned to correspond to a respective photosensor 406. For example, the color filter array 414 can include first and second color filters 414R, 414G and additional color filters in pixels in adjacent rows. For a color imaging device, the first and second color filters 414R, 414G and additional color filters in adjacent rows, are each adapted to pass a selected radiation component in the incident light. The illustrated color filters 414R, 414G are red and green filters for passing respectively red and green light. The red and green filters 414R, 414G, as well as additional green and blue filters in adjacent rows, can be arranged in any of various patterns, such as e.g., a Bayer pattern. For a monochromatic imaging device, the color filters 414R, 414G and additional filters can be similarly formed to pass the same color of light, or otherwise be left out of the imaging device 500. When the color filter array 414 is employed as is shown in FIG. 6, a dielectric layer 416 can be provided over the color filter array 414 for protection.

If desired, a microlens array 418 can be provided over each pixel array 400. In the example shown in FIG. 6, a plurality of microlens arrays 418 are formed in the form of a lens wafer 420. The lens wafer 420 can also have a through-wafer interconnect (TWI) structure and be interconnected with the TWI imager wafer.

As FIG. 6 shows, each image objective lens 306' in each imaging device 500 is formed to expand across or otherwise overlay substantially an entire pixel array 400. In one example, the image objective lens 306' can have a height H in the range from about 50 μm to about 500 μm, or up to about 1000 μm. Additionally or alternatively, the image objective lens 306' can have a lateral dimension W in the range from about 500 μm to about 3 mm, or from about 500 μm to about 2 mm. For example, the lateral dimension W of each image objective lens 306' can be about the same size as a pixel array 400, such as about 2 mm. Those skilled in the art will appreciate that each of the image objective lenses 306' can have various other dimensions depending on size of the underlying pixel array 400 and/or the imaging device 500.

Figure 7:
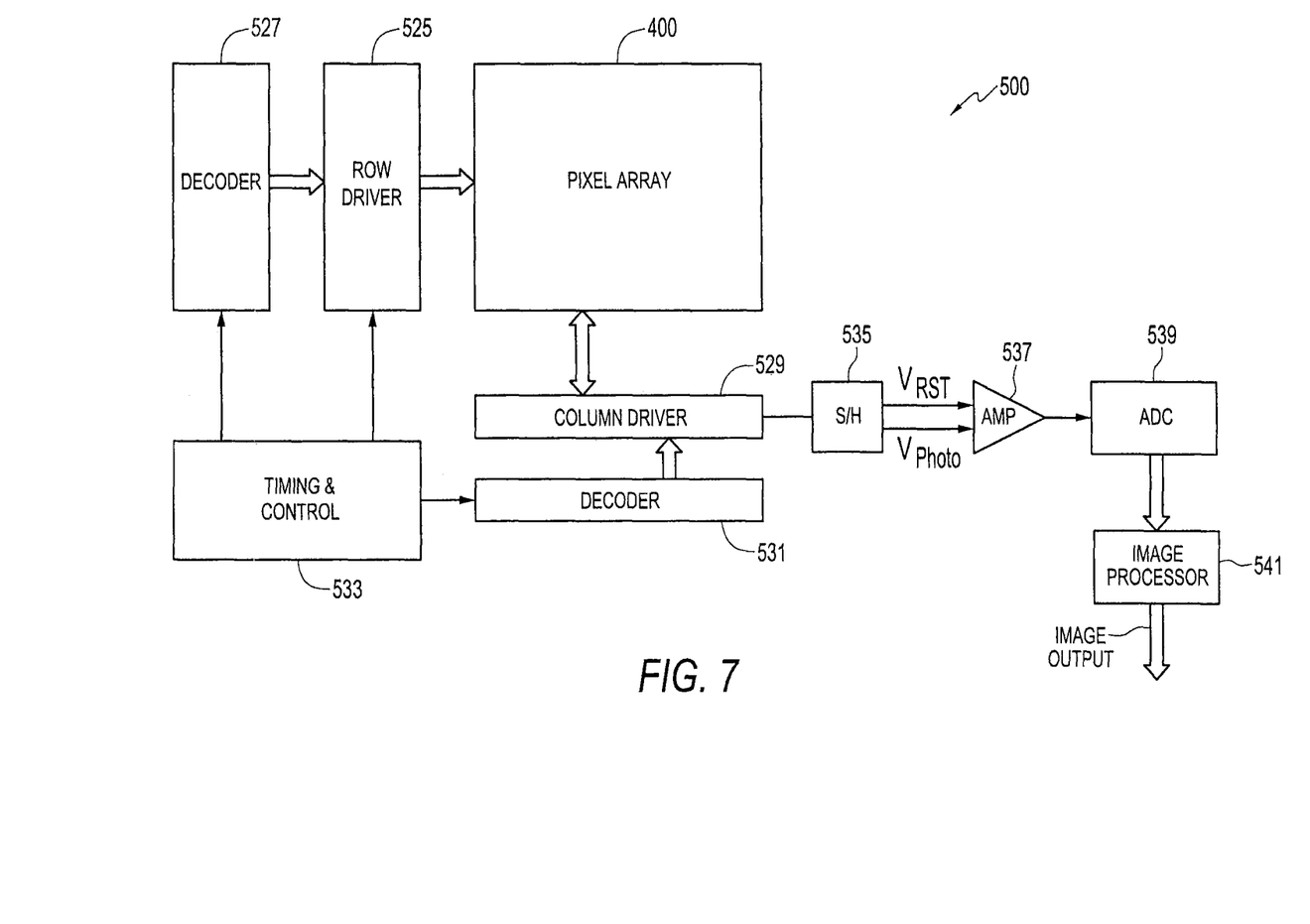
FIG. 7 is a block diagram of an imaging device containing a lens structure constructed in accordance with one of the embodiments.

FIG. 7 is a block diagram of a CMOS imaging device 500. The imaging device 500 contains a pixel array 400 that captures incident radiation passing through and being focused by a lens structure 300, 300a (FIGS. 5C and 5E) formed in accordance with one or more embodiments described above. The pixel array 400 in the imaging device 500 is formed with pixel cells arranged in a predetermined number of columns and rows and convert incident radiation from an optical image to electrical signals, such as analog signals.

The electrical signals obtained and generated by the pixel array 400 can be read out row by row to provide image data of the captured optical image. For example, pixel cells in a row of the pixel array 400 are all selected for read-out at the same time by a row select line, and each pixel cell in a selected column of the row provides a signal representative of received light to a column output line. That is, each column also has a select line, and the pixel cells of each column are selectively read out onto column output lines in response to the column select lines. The row select lines in the pixel array 400 are selectively activated by a row driver 525 in response to a row address decoder 527. The column select lines are selectively activated by a column driver 529 in response to a column address decoder 531.

The imaging device 500 can also comprise a timing and controlling circuit 533, which generates one or more read-out control signals to control the operation of the various components in the imaging device 500. For example, the timing and controlling circuit 533 can control the address decoders 527 and 531 in any of various conventional ways to select the appropriate row and column lines for pixel signal read-out.

The electrical signals output from the column output lines typically include a pixel reset signal ($V_{RST}$) and a pixel image signal ($V_{Photo}$) for each pixel cell. Both the $V_{RST}$ and $V_{Photo}$ signals can be read into a sample and hold circuit (S/H) 535. In one example, a differential signal (an $V_{RST}-V_{Photo}$) can be produced by a differential amplifier (AMP) 537 for each pixel cell. Each pixel cell's differential signal can be digitized by an analog-to-digital converter (ADC) 539, which supplies digitized pixel data as the image data to be output to an image processor 541.

Figure 8:
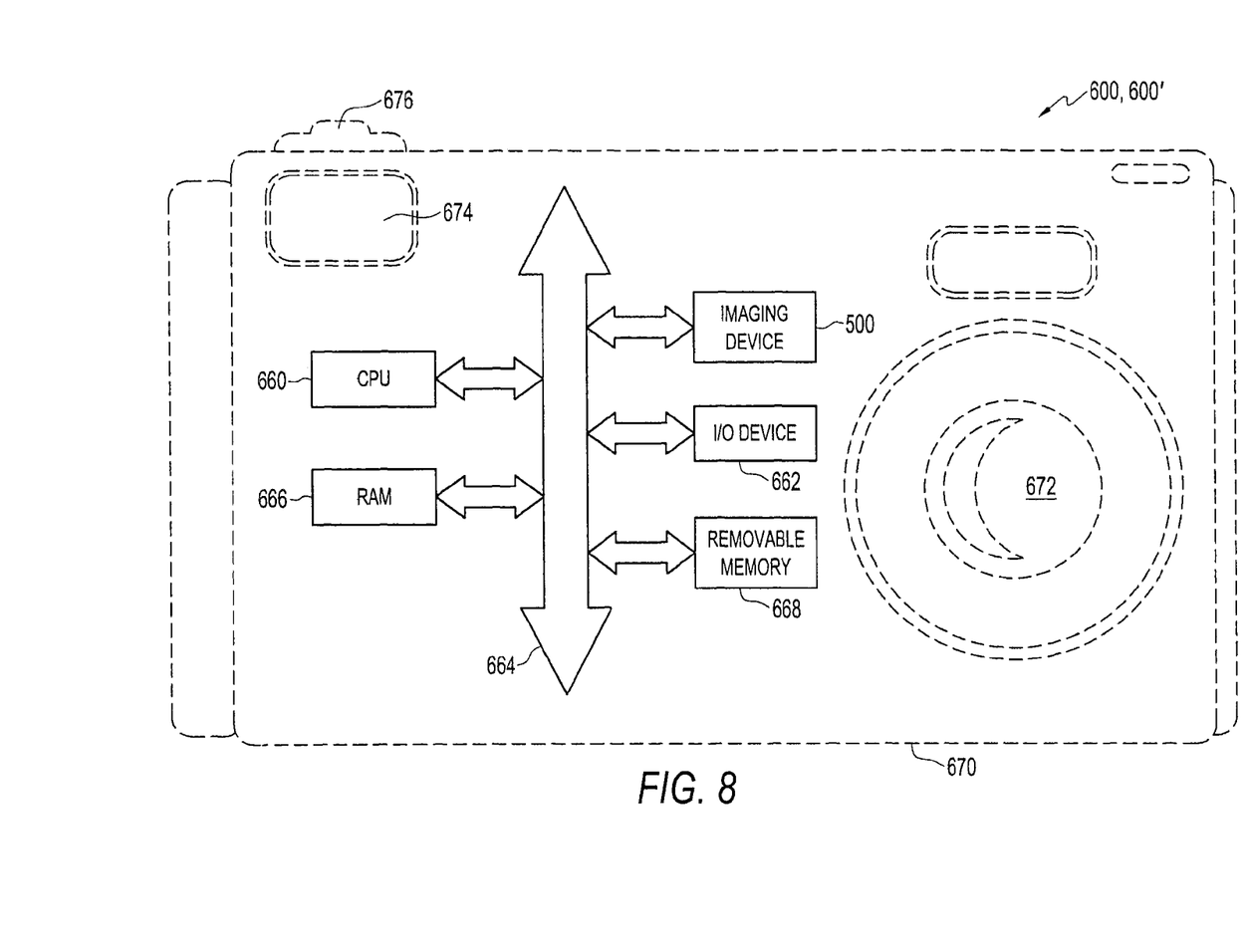
FIG. 8 is an illustration of an imaging system comprising an imaging device formed in accordance with one of the embodiments.

FIG. 8 illustrates a processing system 600 including an imaging device 500 of the type shown in FIG. 7. The imaging device 500 may be combined with a processor, such as a CPU, digital signal processor, or microprocessor, with or without memory storage on a single integrated circuit or on a different chip than the processor. In the example as shown in FIG. 8, the processing system 600 can generally comprise a central processing unit (CPU) 660, such as a microprocessor, that communicates with an input/output (I/O) device 662 over a bus 664. The processing system 600 can also comprise random access memory (RAM) 666, and/or can include removable memory 668, such as flash memory, which can communicate with CPU 660 over the bus 664.

The processing system 600 can be any of various systems having digital circuits that could include the imaging device 500. Without being limiting, such a processing system 600 could include a computer system, a digital camera, a scanner, a machine vision, a vehicle navigation, a video telephone system, a camera mobile telephone, a surveillance system, an auto focus system, a star tracker system, a motion detection system, an image stabilization system, and other systems supporting image acquisition. In the example shown in FIG. 8, the processing system 600 is employed in a digital camera 600', which has a camera body portion 670, camera lens 672, view finder 674, and a shutter release button 676. When depressed, the shutter release button 676 operates the lens 672 and/or imaging device 500 so that light from an image passes through the lens structure 300 (see, e.g., FIG. 7) and is captured by the pixel array 400 (see, e.g., FIG. 7). As those skilled in the art will appreciate, the imaging device 500, the processing system 600, the camera system 600' and other various components contained therein can also be formed and/or operate in various other ways.

It is again noted that although the above embodiments are described with reference to a complementary metal-oxide-semiconductor (CMOS) imaging device, they are not limited to CMOS imaging devices and can be used with other solid state imaging device technology (e.g., CCD technology) as well.

It will be appreciated that the various features described herein may be used singly or in any combination thereof. Therefore, the embodiments are not limited to the embodiments specifically described herein. While the foregoing description and drawings represent examples of embodiments, it will be understood that various additions, modifications, and substitutions may be made therein as defined in the accompanying claims. In particular, it will be clear to those skilled in the art that other specific forms, structures, arrangements, proportions, materials can be used without departing from the essential characteristics thereof. The presently disclosed embodiments are therefore to be considered in all respects as illustrative and not restrictive.

What is claimed as new and desired to be protected by Letters Patent of the United States is:

1. A method of forming a lens template, the method comprising:
   placing a first lens master and a second lens master onto a top surface of a supporting structure, the lens masters each having a shaped portion on a top side, and a planar bottom side opposite the top side, the bottom side extending at least across the entirety of the shaped portion;
   affixing the bottom side of the lens masters to the top surface of the supporting structure to form a lens master device; and
   patterning a template material with the lens master device.

2. A method of claim 1, wherein the patterning step comprises molding the template material with the lens master device.

3. A method of fabricating imaging devices, the method comprising:
   forming a plurality of individual lens masters each having a predetermined shaped portion;
   affixing the individual lens masters to a supporting structure to form a lens master device;
   replicating the predetermined shape portions on the lens master device to form a plurality of lenses supported on a lens wafer; and
   connecting the lens wafer with an imager wafer having a plurality of pixel arrays so that the pixel arrays are each aligned with one of the lenses to form an imaging device, each pixel array comprising a plurality of pixels and column driver and row driver circuitry to activate columns and rows, respectively, of pixels within the respective pixel array.

4. A method of fabricating imaging devices, the method comprising:
   forming a plurality of objective lenses over an imager wafer having a plurality of pixel arrays such that each pixel array is aligned with one of the plurality of lenses to form a plurality of imaging devices, each pixel array comprising a plurality of pixels and column driver and row driver circuitry to activate columns and rows, respectively, of pixels within the respective pixel array; and
   dicing the imager wafer to separate each of the imaging devices.

5. A wafer-level device comprising:
   a plurality of pixel arrays on said device; and
   a plurality of objective lenses formed over the plurality of pixel arrays such that each pixel array is aligned with one of the plurality of objective lenses to form a plurality of imaging devices, each pixel array comprising a plurality of pixels and column driver and row driver circuitry to activate columns and rows, respectively, of pixels within the respective pixel array.

* * * * *